United States Patent [19]

Butsuen et al.

[11] Patent Number: 5,400,245
[45] Date of Patent: Mar. 21, 1995

[54] SHOCK ABSORBER HAVING CONTROLLED DAMPING FORCE CHARACTERISTICS FOR USE IN A SUSPENSION SYSTEM OF A VEHICLE

[75] Inventors: Tetsuro Butsuen; Hiroshi Uchida; Tohru Yoshioka, all of Hiroshima, Japan

[73] Assignee: Mazda Motor Corporation, Hiroshima, Japan

[21] Appl. No.: 180,538

[22] Filed: Jan. 12, 1994

Related U.S. Application Data

[63] Continuation of Ser. No. 690,676, Apr. 24, 1991, abandoned.

[51] Int. Cl.⁶ .............................................. B60G 17/06
[52] U.S. Cl. .................... 364/424.05; 280/707
[58] Field of Search .............. 364/424.05; 280/707, 280/840, DIG. 1

[56] References Cited

U.S. PATENT DOCUMENTS

| | | | |
|---|---|---|---|
| 4,616,848 | 10/1986 | Sugasawa et al. | 280/707 |
| 4,700,971 | 10/1987 | Doi et al. | 280/707 |
| 4,934,731 | 6/1990 | Hiwatashi et al. | 280/707 X |
| 4,936,425 | 6/1990 | Boone et al. | 280/707 X |
| 4,948,166 | 8/1990 | Kaneko | 280/707 |
| 4,949,989 | 8/1990 | Kakizaki et al. | 280/707 |
| 5,056,811 | 10/1991 | Fukunaga et al. | 280/707 |
| 5,060,919 | 10/1991 | Takano et al. | 280/707 X |

FOREIGN PATENT DOCUMENTS

| | | |
|---|---|---|
| 61-110412 | 5/1986 | Japan. |
| 61-163011 | 7/1986 | Japan. |
| 63-40213 | 2/1988 | Japan. |

*Primary Examiner*—Gary Chin
*Assistant Examiner*—Collin W. Park
*Attorney, Agent, or Firm*—Thompson, Hine and Flory

[57] ABSTRACT

A suspension system of a vehicle for calculating a product of the absolute speed $\dot{z}s$ of the sprung member and the relative speed $\dot{z}s - \dot{z}u$ between the sprung member and the unsprung member and for controlling the damping force characteristic of the shock absorber to be higher if that product is more than the predetermined value and to be lower if the product is less than that value. An insensible range is formed for restricting switching of the damping force characteristic when $|\dot{z}s|$ and $|\dot{z}s - \dot{z}u|$ are less than the predetermined value $\delta z$, $\delta r$, so that the damping force characteristic of the shock absorber is kept lower if $|\dot{z}s| < \delta z$ and $|\dot{z}s - \dot{z}u|$ or $|zs - zu| < \delta r$ and it is kept higher if $|\dot{z}s| > \delta z$ and $|\dot{z}s - \dot{z}u|$ or $|zs - zu| < \delta r$. Through the above structure, unnecessary switching of the damping force characteristic of the shock absorber can be prevented without lowering the riding comfort and running stability. Also, a sensor for detecting oscillation frequency is not required, resulting in lesser cost.

20 Claims, 8 Drawing Sheets

SHOCK ABSORBER HAVING CONTROLLED DAMPING FORCE CHARACTERISTICS FOR USE IN A SUSPENSION SYSTEM OF A VEHICLE

This is a continuation of application Ser. No. 07/690,676, filed Apr. 24, 1991, now abandoned.

BACKGROUND OF THE INVENTION

This invention relates to a suspension system for a vehicle and more particularly to a suspension system which comprises a shock absorber of damping force characteristic variable type provided between a sprung member and an unsprung member.

In general, a suspension system for a vehicle comprises a shock absorber, for damping the oscillation of a wheel, interposed between a sprung member and an unsprung member. There are various types of shock absorbers and shock absorbers of damping force characteristic variable type are grouped into one which damping force characteristic (characteristic of different damping coefficient) is changed into two levels (higher level and lower level) and the another which the damping force characteristic is changed into many levels or changed without steps.

A well known shock absorber of damping force characteristic variable type is, as disclosed in the Japanese Patent Application Laying Open Gazette No. 61-163011, is to detect absolute speed of the sprung member and relative speed between the sprung member and the unsprung member by each detecting means and check signs of them. If these signs are not same, it is observed that the damping force generated by the shock absorber is acting on the oscillation-stimulating direction with respect to the vertical oscillation of a vehicle and set the damping force characteristic of a shock absorber lower (i.e., SOFT side). When these signs are same, it is is observed that the damping force is acting on oscillation-restricting direction and set the damping force characteristic of the shock absorber higher (i.e., HARD side). Thus, passenger riding comfort and running stability is improved.

The Japanese Utility Model Registration Application Laying Open Gazette No. 61-110412 and 63-40213 disclose a shock absorber in which an insensible range is formed near neutral position with respect to the relative displacement between the sprung member and the unsprung member in order to prevent the frequent switching of the damping force characteristic of the shock absorber near the neutral position of that displacement. In this insensible range, switching of the damping force characteristic of the shock absorber is restricted and lower damping force characteristic is maintained.

Maintaining the lower damping force characteristic of the shock absorber in the insensible range is effective when the sprung member is in high oscillation frequency region due to the road bumps. However, if lower damping force characteristic of the shock absorber is maintained when the sprung member is in low oscillation frequency range, running stability is not be satisfied.

In order to solve the above problem, a method may be taken for detecting the oscillation frequency of the sprung member by a sensor so that the damping force characteristic in the insensible range is set lower during high oscillation frequency region and the damping force characteristic in the insensible range is set higher during low oscillation frequency region. However, this method requires a sensor for detecting the oscillation frequency and results in higher cost.

Figure 6:
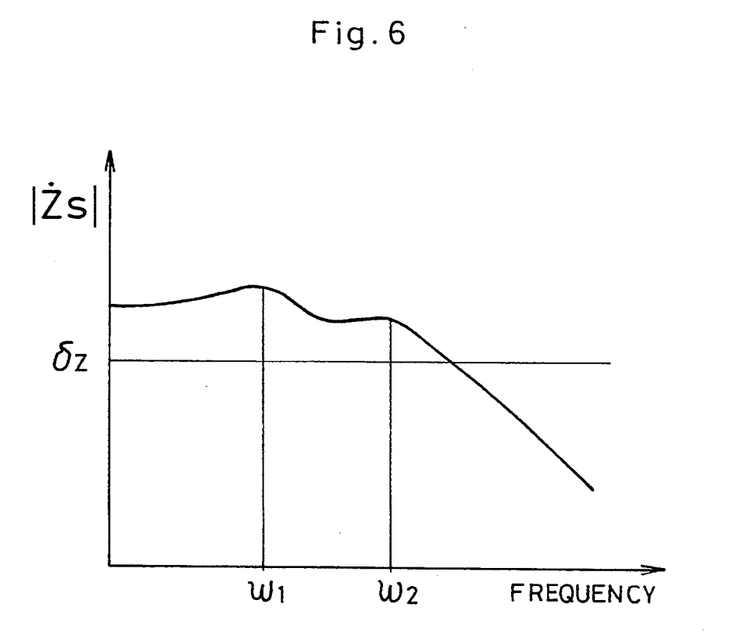
FIG. 6 is a graph illustrating a relationship between an absolute value of an absolute speed of a spring member and an oscillation frequency.
Figure 7:
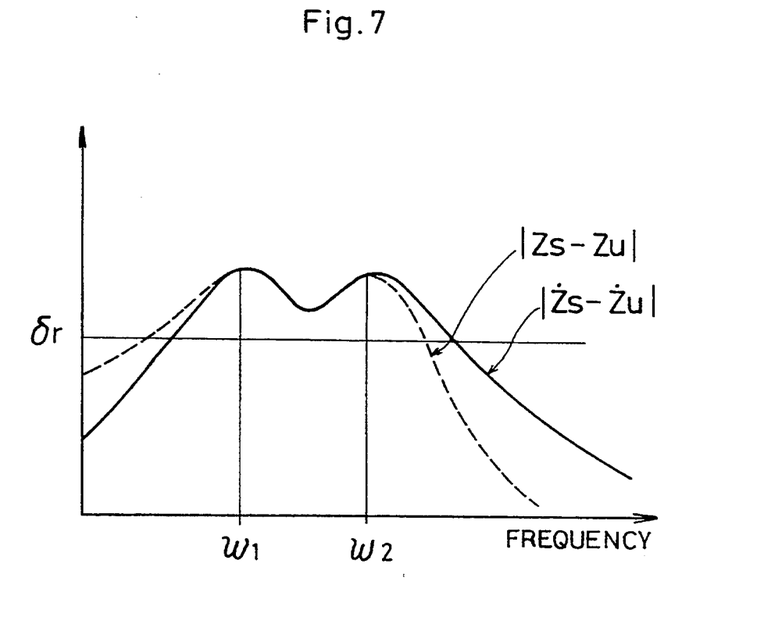
FIG. 7 is a graph illustrating a relationship of an absolute value of relative speed between a sprung member and an unsprung member and an absolute value of relative speed between a sprung member and an unsprung member with respect to oscillation frequency.

On the other hand, when considering the absolute value of the absolute speed of the sprung member and absolute value of either the relative displacement between the sprung member and the unsprung member or the relative speed between the sprung member and the unsprung member with respect to oscillation frequency, $|\dot{z}s|$ which is the absolute value of the absolute speed of the sprung member is, as shown in FIG. 6, kept higher during oscillation frequency is lower than the resonance point $\omega2$ (near $10 \sim 20$ Hz) of the unsprung member and decreased during oscillation frequency is higher than the resonance point $\omega2$ of the unsprung member. Also, each $|\dot{z}s - \dot{z}u|$ which is the absolute value of the relative speed between the sprung member and the unsprung member and $|zs-zu|$ which is the absolute value of the relative displacement between the sprung member and the unsprung member is, as shown in FIG. 7, maximum at both the resonance point $\omega1$ (near $1.0 f 2.0$ Hz) of the sprung member and the resonance point $\omega2$ of the unsprung member and decreases during the oscillation frequency is lower than the resonance point $\omega1$ of the sprung member and during the oscillation frequency is higher than the resonance point $\omega2$ of the unsprung member.

SUMMARY OF THE INVENTION

The object of the present invention is to provide a suspension system which utilizes characteristics of an absolute value of absolute speed of a sprung member, an absolute value of relative displacement between the sprung member and an unsprung member, and an absolute value of the relative speed between the sprung member and the unsprung member and distinguishes high oscillation frequency region and low oscillation frequency region by these characteristics, so that the damping force characteristic of the shock absorber within the insensible range is kept either higher or lower.

In order to achieve the above object, the suspension system for a vehicle has the hereinafter described construction.

The suspension system for a vehicle comprises a shock absorber of damping force characteristic variable type interposed between the sprung member and the unsprung member, a sprung-member absolute speed detecting means for detecting the absolute speed of the sprung member, a relative speed detecting means for detecting the relative speed between the sprung member and the unsprung member, and a control means for controlling the damping force characteristic of the shock absorber to be higher if a product, which is the absolute speed of the sprung member multiplied by the relative speed between the sprung member and the unsprung member, is more than a predetermined value and to be lower if that product is equal to or less than the predetermined value. Moreover, an insensible range setting means is provided for forming an insensible range which restricts the switching of the damping force characteristic when each the absolute value of the absolute speed of the sprung member and the absolute value of either the relative speed between the sprung member and the unsprung member or the relative displacement between the sprung member and the unsprung member is less than each predetermined value. The damping force characteristic of the shock absorber is kept lower when each absolute speed of the sprung member and either the relative speed between the sprung member and the unsprung member or the relative displacement between the sprung member and the unsprung member is each within an insensible range and the damping force characteristic of the shock absorber is kept higher when the absolute speed of the sprung member is out of its insensible range and either the relative speed between the sprung member and the unsprung member or the relative displacement between the sprung member and the unsprung member is within the insensible range.

By the above structure, the insensible range setting means distinguishes high oscillation frequency region and low oscillation frequency region on the basis of the absolute speed of the sprung member detected by the sprung-member absolute speed detecting means and the relative speed between the sprung member and the unsprung member detected by the relative speed detecting means or relative displacement between the sprung member and the unsprung member, which is an integrated value of the relative speed. Then it changes the damping force characteristic of the shock absorber in the insensible range according to the oscillation region. That is, if absolute speed of the sprung member and either the relative speed between the sprung member and the unsprung member or relative displacement between the sprung member and the unsprung member are in insensible ranges, it is defined as a high oscillation frequency region and the damping force characteristic of the shock absorber is kept lower. On the contrary, if the absolute speed of the sprung member is out of its insensible range and relative speed between the sprung member and the unsprung member or relative displacement between the sprung member and the unsprung member is in the insensible range, it is defined as the low oscillation frequency region and the damping force characteristic of the shock absorber is kept higher. Through this, the unnecessary switching of the damping force characteristic of the shock absorber is prevented without lowering the comfortableness to ride in and running stability, and reducing the noise and oscillation can be planned. Moreover, a sensor for detecting the oscillation frequency is not required, resulting in lesser cost.

The above and further objects and advantages of the present invention will be apparent by reading the following description with reference to the accompanying drawings.

DESCRIPTION OF THE DRAWINGS

Accompanying drawings show preferred embodiments of the present invention, in which.

DESCRIPTION OF THE PREFERRED EMBODIMENT

The preferred embodiment is described below with reference to the accompanying drawings.

Figure 1:
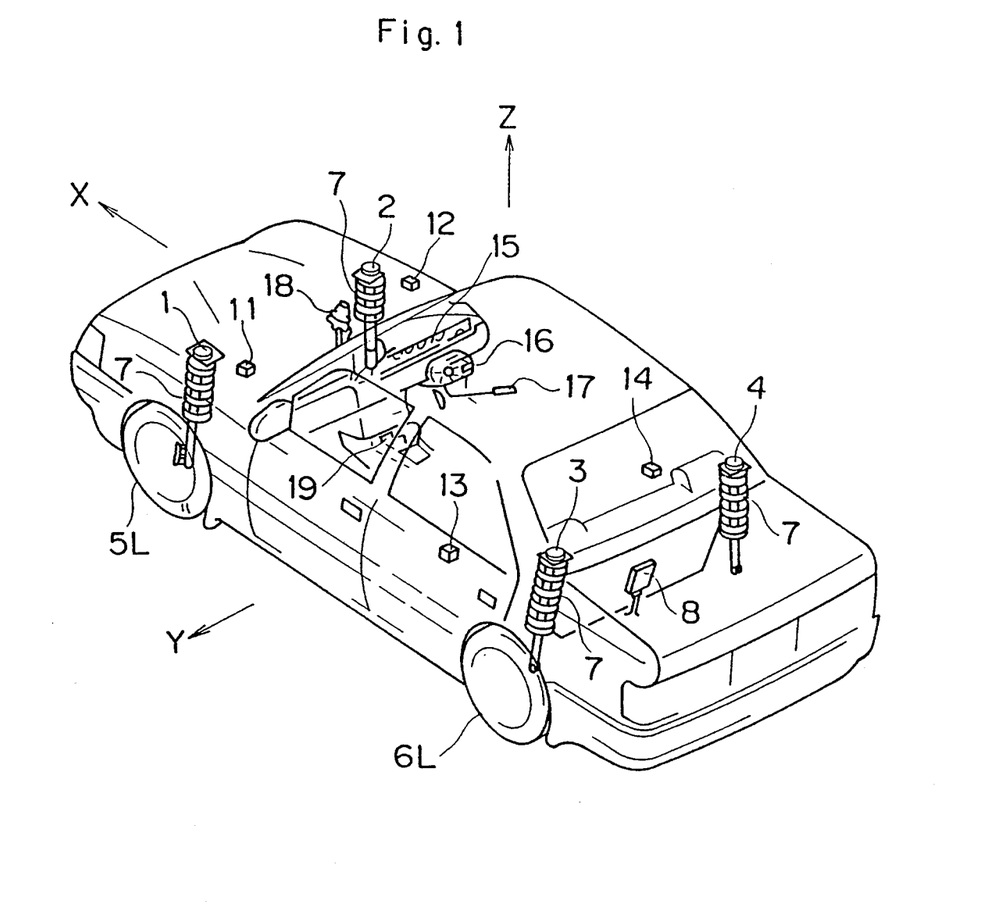
FIG. 1 is a perspective view showing layout of components of a suspension system.

FIG. 1 shows a layout of components of a suspension system. In FIG. 1, reference numerals 1~4 designate four shock absorbers, for damping the oscillation of wheels, provided in right and left front wheels (only left front wheel 5L is shown in the drawings) and right and left rear wheels (only left rear wheel 6L is shown in the drawings). Each shock absorber 1~4 has an actuator 25 (refer to FIG. 2) for switching damping force characteristic of a shock absorber to either higher level or lower level and a vehicle height sensor (not shown in the drawings) for detecting relative displacement between a sprung member and an unsprung member. Reference numeral 7 designates a coil spring provided at outer circumference of each shock absorber 1~4 at its upper part, and reference numeral 8 designates a control unit for controlling the damping force characteristic variably by receiving a signal from the above vehicle height sensor of each shock absorber 1~4 and outputting a signal to the actuator provided in each shock absorber 1~4.

Reference numerals 11~14 designate four acceleration sensors for detecting acceleration in the vertical direction (Z direction) of the sprung member of a wheel, 15 designates a vehicle speed sensor for detecting a vehicle speed provided in a meter of an instrument panel, 16 designates a steering angle sensor for detecting a steering angle of the front wheels by the rotation of the steering shaft, 17 designates an accelerator opening sensor for detecting an opening of an accelerator, 18 designates a brake pressure switch for checking whether the brake is under operation (i.e., whether the vehicle is braking) on the basis of the brake fluid pressure, and 19 designates a mode selecting switch by which a driver switches the damping force characteristics of the shock absorbers 1~4 to either HARD, SOFT, or CONTROL. Those sensors 11~17 and switches 18 and 19 output signals to the control unit 8.

Figure 2A:
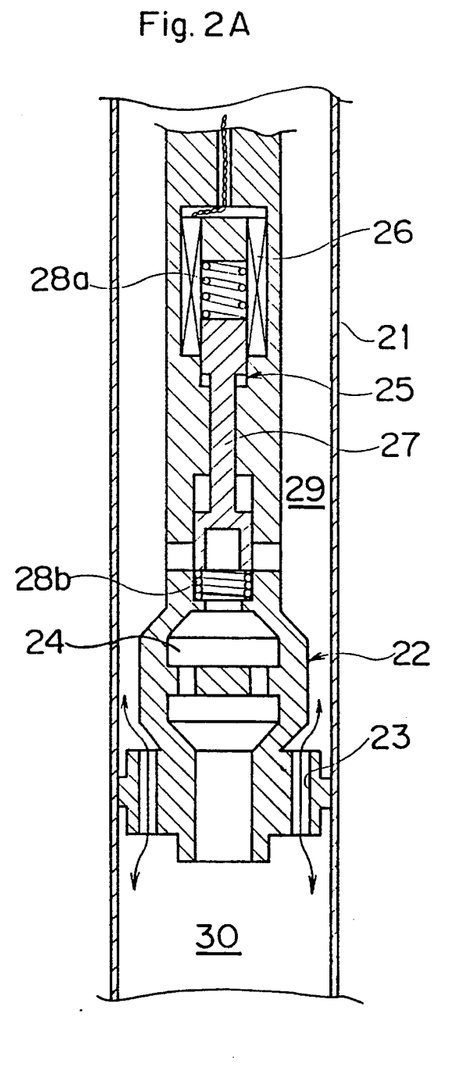
FIG. 2A and FIG. 2B show a vertical sectional view of a main part of a shock absorber.
Figure 2B:
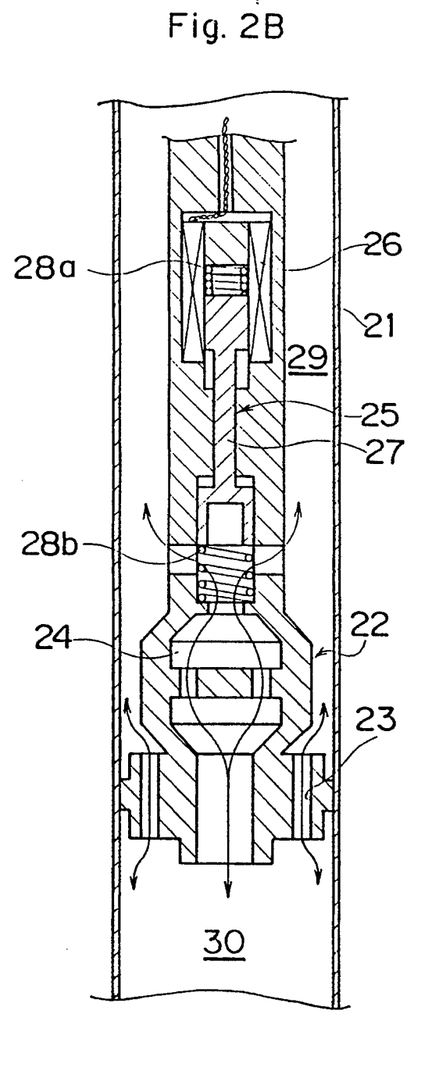

FIGS. 2A and 2B show the structure of each shock absorber 1~4, where FIG. 2A is illustrating a case that the damping force characteristic of each shock absorber 1~4 is HARD (high damping force is generated) and FIG. 2B is illustrating a case that the damping force characteristic of each shock absorber 1~4 is SOFT (low damping force is generated). The vehicle height sensor in each shock absorber 1~4 is not shown in this drawing.

In FIG. 2, reference numeral 21 designates a cylinder, a piston unit 22 formed by a piston and a piston rod is inserted slidably therein. The cylinder 21 and the piston unit 22 are mounted to the axle (unsprung member) or a vehicle body (sprung member) through each joint.

Two orifices 23, 24 are provided in the piston unit 22. The one orifice 23 is open at all times, and the another orifice 24 is openable/closable by an actuator 25. The actuator 25 is consisted of a solenoid 26, a control rod 27, and two springs 28a, 28b. The control rod 27 slides vertically in the piston unit 22 by magnetic force from the solenoid 26 and force from the both springs 28a, 28b so that the orifice 24 is opened/closed.

An upper chamber 29 and a lower chamber 30 in the cylinder 21 and a hollow part, for communicating with both chambers, provided in the piston unit 22 are filled with fluid having adequate viscosity. This fluid can flow between the upper chamber 29 and the lower chamber 30 through either orifice 23 or 24.

The explanation is made below about the action of each shock absorber 1-4.

When the solenoid 26 is not electrified, the control rod 27 is pushed downwardly since the force of the spring 28a, which acts on the control rod 27 to push it downwardly, is set larger than the force of the spring 28b, which acts on the control rod 27 to push it upwardly, then the orifice 24 is closed (refer to FIG. 2A). Therefore, the fluid can flow only through the orifice 23 and the damping force characteristic of each shock absorber 1~4 is set HARD (higher damping force).

Figure 3:
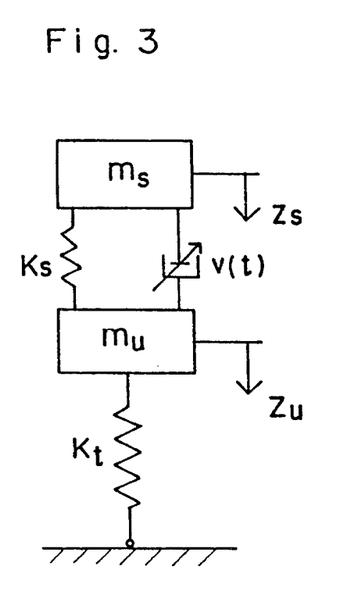
FIG. 3 is a diagram illustrating oscillation of a suspension system.

When the solenoid 26 is electrified, the control rod 27 is pushed upwardly by the magnetic force of the solenoid 26, then the orifice 24 is opened (refer to FIG. 2B). Therefore, the fluid can flow through both orifices 23, 24 and the damping force characteristic of each shock absorber 1~4 is set SOFT (lower damping force). As described above, since the damping force characteristic of each shock absorber 1~4 is HARD when the solenoid 26 is not electrified, each shock absorber 1~4 is kept HARD even if the control unit 8 is in trouble and worsening steering stability is prevented. FIG. 3 shows the oscillation model of the suspension system, where ms designates sprung mass, mu designates unsprung mass, zs designates displacement of the sprung member, zu designates displacement of the unsprung member, ks designates a spring constant of a coil spring 7, ri designates a spring constant of a tire, and v(t) designates a damping coefficient of a shock absorber.

Figure 4:
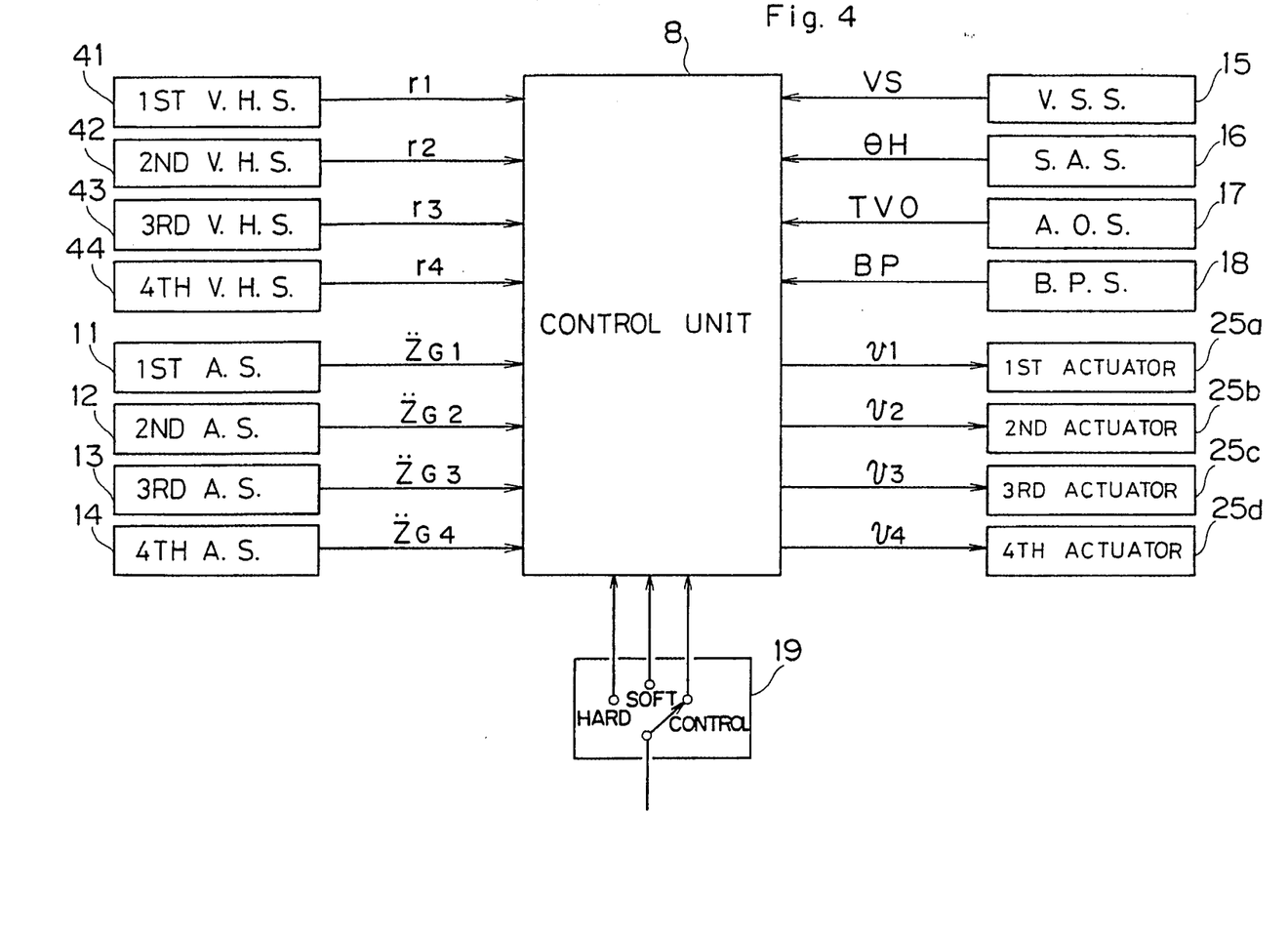
FIG. 4 is a block diagram illustrating a control part of a suspension system.

FIG. 4 shows the block diagram of a control part of the suspension system. In FIG. 4, a first set of a vehicle height sensor 41, an acceleration sensor 11, and an actuator 25a corresponds to a front left wheel 5L, so as a second set of a vehicle height sensor 42, an acceleration sensor 12, and an actuator 25b corresponds to a front right wheel, a third set of a vehicle height sensor 43, an acceleration sensor 13, and an actuator 25c corresponds to a rear left wheel 6L, and a forth set of a vehicle height sensor 44, an acceleration sensor 14, and an actuator 25d corresponds to a rear right wheel. The actuators 25a~25d are identical with the actuator 25 of FIG. 2 and each the vehicle height sensor 41~44 is provided in each shock absorber 1-4.

Also, r1~r4 designates signals of relative displacement between the sprung member and the unsprung member outputted to the control unit 8 from the first~-forth vehicle height sensors 41~44, and those signals take continuous numbers. When each shock absorber 1~4 extends, the signal is positive and when each shock absorber 1~4 is compressed, the signal is negative. The relative displacement is expressed by the deviation from the relative displacement where a vehicle is not moving, which is defined 0, (i.e., zs−zu, the difference between zs which is the displacement of the sprung member and zu which is the displacement of the unsprung member as shown in FIG. 3).

Signals of $\ddot{z}_G1$~$\ddot{z}_G4$, vertical (Z direction) absolute acceleration of the sprung member, are outputted to the control unit 8 from the first~forth acceleration sensors 11~14, and those signals take continuous numbers. When the sprung member receives the upward acceleration, the signal $\theta$H, is positive and when the sprung member receives the downward acceleration, the signal is negative.

Vehicle speed signal VS, steering angle signal accelerator opening signal TVO are outputted to the control unit 8 from a vehicle speed sensor 15, a steering angle sensor 16, and an accelerator opening sensor 17 respectively. Those signals take continuous numbers. The vehicle speed signal VS is positive when the vehicle moves forwardly and it is negative when the vehicle moves rearwardly. The steering angle signal $\theta$H is positive when a steering wheel turns to counterclockwise from a driver (i.e., turning to the left), and it is negative when the steering wheel turns to clockwise (i.e., turning to the right).

Brake pressure signal BP is outputted to the control unit 8 from a brake pressure switch 18, and the signal has two alternatives, ON or OFF. "On" means that the brake is under operation and "OFF" means that the brake is not under operation.

Actuator control signals v1~v4 are outputted to the actuaters 25a~25d from the control unit 8, and those signals have two alternatives, [1] or [0]. When it is [1] (refer to FIG. 2), the solenoid 26 of the actuator 25 is not electrified and the damping force characteristic of each shock absorber 1~4 is HARD. When it is [0], the solenoid 26 of the actuator 25 is electrified and the damping force characteristic of each shock absorber 1~4 is SOFT.

Moreover, mode selecting signal is outputted to the control unit 8 from the mode selecting switch 19, this signal is a parallel signal and takes either HARD, SOFT, or CONTROL in the present invention. "HARD" means that a driver selects HARD mode, so as SOFT means that a driver selects SOFT mode, and CONTROL means that the a driver selects CONTROL mode. As will be described later, when HARD mode is selected, the damping force characteristic of all shock absorbers 1~4 is set HARD, and when SOFT mode is selected, the damping force of all shock absorbers 1~4 is set SOFT. However, when CONTROL mode is selected, the damping force characteristic of each shock absorber 1~4 is switched to either HARD or SOFT according to the driving condition and the road surface.

Figure 5A:
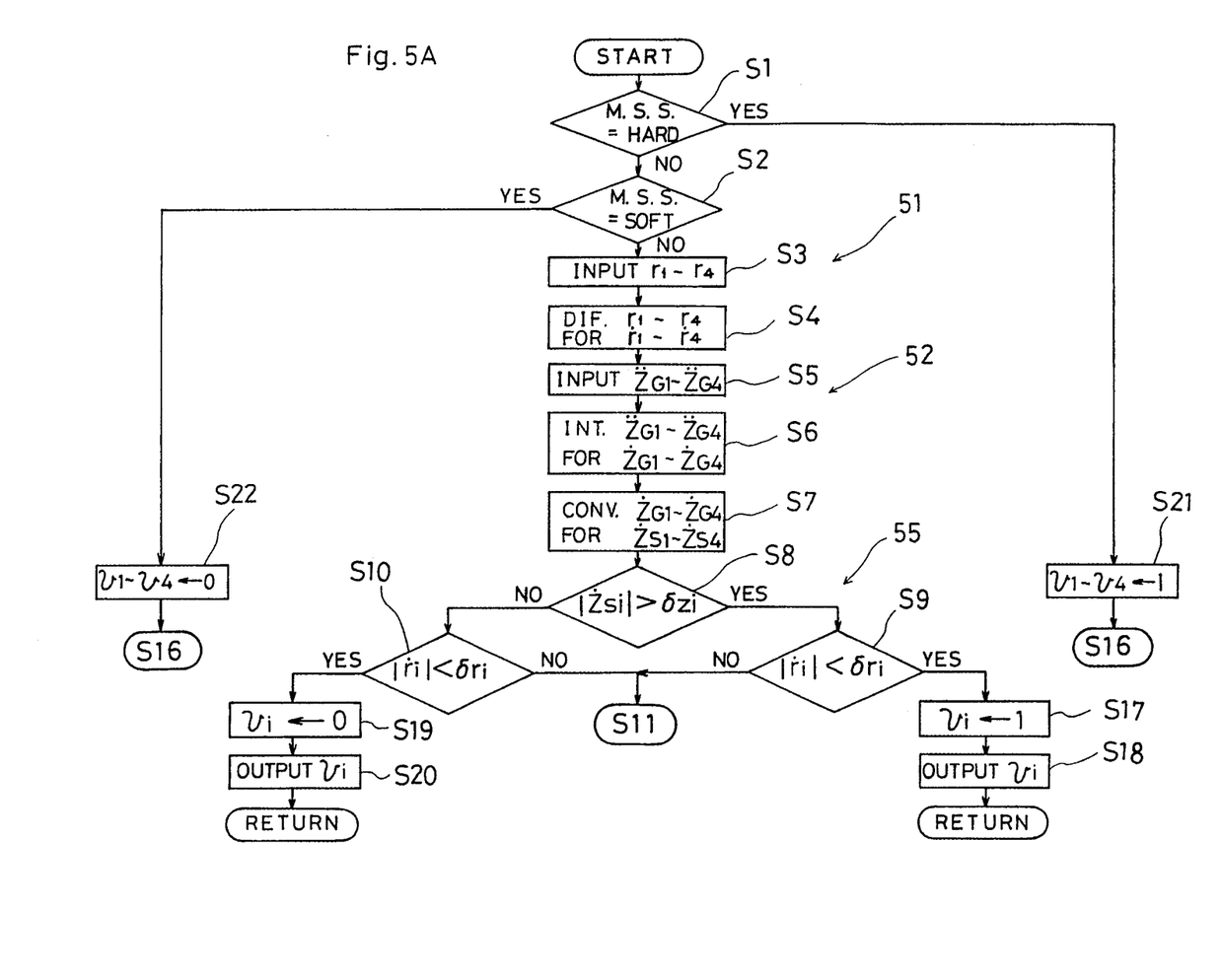
FIGS. 5A and 5B show a flow chart illustrating control flow.
Figure 5B:
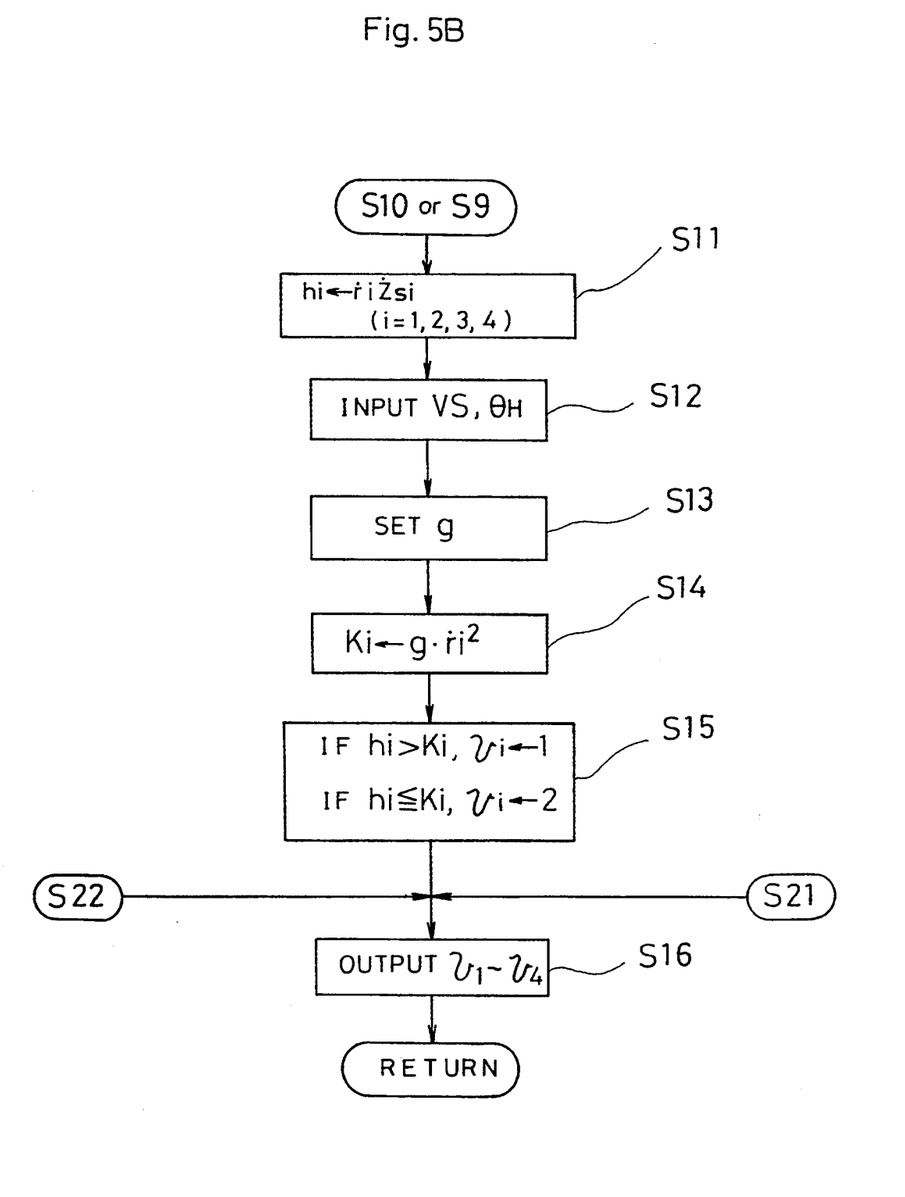

FIG. 5 shows a control flow of the control unit 8. This control is processed by the control program of the control unit 8. This control program is repeated in a given interval (1~10 ms) by a starting program. The control is described below with this control flow.

First, at step S1, the mode selecting signal is checked whether it is HARD. If this judgement is YES, which means it is HARD, the all actuator control signals v1~v4 are set [1] at step S21 and these control signals v1~v4 are outputted at step S16. By this way, the damping force characteristic of all shock absorber 1~4 is set HARD. The flow is finished here.

If the mode detecting signal in not HARD, it is checked whether the mode selecting signal is SOFT at step S2. If this judgement is YES, which means it is SOFT, the all actuator control signals v1~v4 are set [0] at step S22 and this control signals v1~v4 are outputted at step S16. By this way, the damping force characteristic of all shock absorbers 1~4 is set SOFT. The flow is finished here.

If both judgement at steps S1, S2 are NO, which means the mode selecting signal is CONTROL, signals r1~r4 of relative displacement between the sprung member and the unsprung member are inputted at step S3, then these signals r1~r4 are differentiated by differentiation or so at step S4 in order to gain $\dot{r}1\sim\dot{r}4$ which are signals of relative speed between the sprung member and the unsprung member. A relative speed detecting means 51 for detecting $\dot{r}1\sim\dot{r}4$, the relative speed between the sprung member and the unsprung member (i.e., the difference between the absolute speed of the sprung member and the absolute speed of the unsprung member, $(\dot{z}s1-\dot{z}u1) \sim (\dot{z}s4-\dot{z}u4)$), is formed by the above steps S3, S4 and the vehicle height sensors 41–44.

Next, after signals $\ddot{z}_G1\sim\ddot{z}_G4$ which are the absolute acceleration of the sprung member are inputted at step S5, these $\ddot{Z}_G1\sim\ddot{z}_G4$ are integrated by integration or so at step S6 in order to gain the vertical absolute vehicle speed $\dot{Z}_G1\sim\dot{z}_G4$. Since these $\dot{Z}_G1\sim\dot{z}_G4$ are vertical absolute speed of the sprung member at the acceleration sensors 11~14, they are converted to $\dot{z}s1\sim\dot{z}s4$ which are vertical absolute speed of the sprung member at the shock absorbers 1~4 at step S7. These $\dot{z}s1\sim\dot{z}s4$ can be gained if three values of $\dot{Z}_G1\sim\dot{z}_G4$ are found, so $\dot{Z}_G1\sim\dot{z}_G3$ will be used and $\dot{z}_G4$ is a substitute. Here, as shown in FIG. 1, suppose a imaginary horizontal xy coordinate is provided. The coordinates for the acceleration sensors 11~13 are expressed $(x_G1,y_G1)\sim(x_G3,y_G3)$ and the shock absorbers 1~4 are expressed by $(xs1,ys1)\sim(xs4,ys4)$, then $\dot{z}s1\sim\dot{z}s4$ are obtained by the following formula:

$$\begin{bmatrix} \dot{z}s1 \\ \dot{z}s2 \\ \dot{z}s3 \\ \dot{z}s4 \end{bmatrix} = \begin{bmatrix} 1 & ys1 & -xs1 \\ 1 & ys2 & -xs2 \\ 1 & ys3 & -xs3 \\ 1 & ys4 & -xs4 \end{bmatrix} \begin{bmatrix} 1 & y_G1 & -x_G1 \\ 1 & y_G2 & -x_G2 \\ 1 & y_G3 & -x_G3 \end{bmatrix}^{-1} \begin{bmatrix} \dot{z}_G1 \\ \dot{z}_G2 \\ \dot{z}_G3 \end{bmatrix}$$

where two efficient matrixes and a product of them are predetermined and given as a constant.

A sprung-member absolute speed detecting means 52 for detecting $\dot{z}s1\sim zs4$, the vertical absolute speed of the sprung member at the shock absorber 1~4, is formed by the above steps S5~S7 and the acceleration sensors 11~14.

Thereafter, at step S8, the absolute value of $\dot{z}si$ (i=1, 2, 3, 4), the absolute speed of the sprung member of each wheel, is checked whether it is more than a predetermined value δzi. If this judgement is YES, the absolute value of $\dot{r}i$, the relative speed between the sprung member and the unsprung member for each wheel, is checked whether it is less than a predetermined value δri at step S9. If the judgement at step S8 is NO, the absolute value of $\dot{r}i$, the relative speed between the sprung member and the unsprung member for each wheel, is checked whether it is less than the predetermined value δri at step S10.

The above δzi is a predetermined value for setting insensible range which restricts switching of the damping force characteristic of each shock absorber 1~4 with respect to $\dot{z}si$, the absolute speed of the unsprung member. As shown in FIG. 6, $|\dot{z}si|$, the absolute value of the absolute speed of the sprung member, is set less than the predetermined value during the oscillation frequency is higher than the resonance point ω2 of the unsprung member. The above δri is a predetermined value for setting insensible range which restricts switching of the damping force characteristic of each shock absorber 1~4 with respect to $\dot{r}i(=\dot{z}si-\dot{z}ui)$, the relative speed between the sprung member and the unsprung member. As shown in FIG. 7, $|\dot{r}i|$, the absolute value of the relative speed between the sprung member and the unsprung member, is set lesser than the predetermined value during the oscillation frequency is less than the resonance point ω1 of the sprung member and the oscillation frequency is higher than the resonance point ω2 of the unsprung member.

Thereafter, if either judgement at step S9 or S10 is NO, the judging function hi is obtained by the following formula at step S11:

$$hi = \dot{r}i \cdot \dot{z}si \quad (i=1, 2, 3, 4)$$

This judging function hi is a product which is ri, the relative speed between the sprung member and the unsprung member, multiplied by $\dot{z}si$, the absolute speed of the sprung member, at each wheel.

Figure 8:
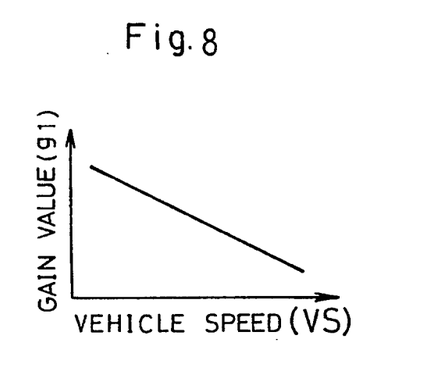
FIGS. 8 and 9 are graphs illustrating relationships between gain value and vehicle speed and between gain value and steering angle respectively.
Figure 9:
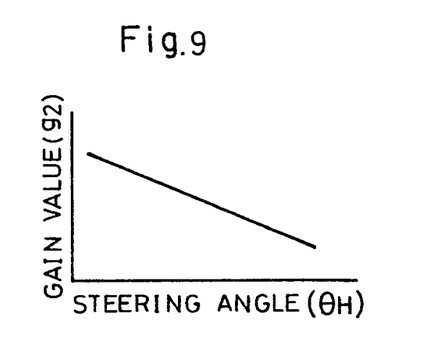

A vehicle speed signal VS and a steering angle signal θH are inputted at step S12 and gain value g is set at step S13. The gain value g is a product (g=g1·g2) which is a gain value g1 multiplied by a gain value g2, g1 is a gain value with respect to the vehicle speed and g2 is a gain value with respect to the steering angle and both gain values are obtained by the prememorized maps shown in FIGS. 8 and 9 respectively. The gain value g1 decreases while the vehicle speed increases and also the gain value g2 decreases while the steering angle increases. At step S14, a predetermined value Ki (=g·$\dot{r}i^2$) is set, Ki is the above gain value g multiplied by a square of $\dot{r}i$ of relative speed between the sprung member and the unsprung member.

After setting the predetermined value Ki, at step S15, if the judging function hi obtained at step S11 is more than the predetermined value Ki (hi>Ki), then vi=1 and if hi is equal to or less than the predetermined value Ki (hi≦Ki), then vi=0. Thereafter, actuator control signals v1~v4 are outputted at step S16 and the flow is returned to the start. A control means 53, for calculating the judging function hi which is $\dot{r}i$, the relative speed between the sprung member and the unsprung member, multiplied by $\dot{z}si$, the absolute speed of the sprung member, and for switching the damping force characteristic of each shock absorber 1~4 to either HARD or SOFT according to whether hi is more than the predetermined value Ki, is formed by the above steps S11, S15, and S16. Also a predetermined value changing means 54 for changing the predetermined value Ki according to the driving condition and road surface is formed by the steps S12~S14. If the judging function hi is equal to the predetermined value Ki(hi=Ki), the actuator control signal v1 can be kept in the prior state and accordingly the damping force characteristic is not changed.

On the other hand, if the judgement at step S9 is YES, the actuator control signal vi of the shock absorber is set [1], and this control signal vi is outputted at step S18. If the judgement at step S10 is YES, the actuator control signal vi of the corresponding actuator is set [0] at step S19 and outputted at step S20. Insensible range setting means 55 is constructed by the steps S8~S10 and S17~S20. This means is for maintaining the damping force characteristic of each shock absorber 1~4 in SOFT when both absolute speed of the sprung member and either the relative speed between the sprung member and the unsprung member or the relative displacement between the sprung member and the unsprung member are in insensible ranges (the judgement at step S8 is NO, and at step S10 is YES) or for maintaining the damping force characteristic of each shock absorber 1~4 in HARD when the absolute speed of the sprung member is out of the insensible range and the relative speed between the sprung member and the unsprung member is in the insensible range (both judgements at steps S8 and S9 are YES).

According to the above control, if a driver selects the CONTROL mode and the judging function hi, which is $\dot{r}i$ (= $\dot{z}si - \dot{z}ui$), the relative speed between the sprung member and the unsprung member, multiplied by $\dot{z}si$, the absolute speed of the sprung member, is more than the predetermined value Ki (hi>Ki) (i.e., the damping force acts downwardly when the sprung member bounces upwardly and each shock absorber 1~4 extends, or the damping force acts upwardly when the sprung member bounces downwardly and each shock absorber 1~4 is compressed), it is observed that the damping force generated by each shock absorber 1~4 acts in the oscillation-restraining direction with respect to the vertical oscillation of the sprung member, then the damping force characteristic of each shock absorbers 1~4 is changed to HARD. If the judging function hi is equal to or less than Ki (hi≦Ki) (the contradictory situation of the above), it is observed that the damping force generated by each shock absorber 1~4 acts in the oscillation-stimulating direction with respect to the vertical oscillation of the sprung member, then the damping force characteristic of each shock absorber 1~4 is changed to SOFT. By this way, the oscillation-restraining energy becomes larger than the oscillation-stimulating energy which is transmitted to the sprung member and accordingly, riding comfort and running stability is improved.

The predetermined value Ki is a product (=g·$\dot{r}i$) which is the gain value g multiplied by a square of $\dot{r}i$, the relative speed between the sprung member and the unsprung member, and therefore it becomes large in the high oscillation frequency region of the sprung member due to road bumps. Thus, the damping force characteristic of each shock absorber 1~4 in the high oscillation frequency region is hardly changed to HARD, and noise and oscillation caused by unnecessary changing of the damping force characteristic can be prevented. Also, unsmooth feeling on the sprung member caused by the road bumps is restricted and riding comfort is improved.

Moreover, the predetermined value changing means 54 for changing the predetermined value Ki according to the road bumps and the oscillation caused by it does not need a detecting means for detecting the road surface or vehicle oscillation region. Therefore, the present embodiment possesses an advantage such as lesser cost.

Furthermore, since the gain value g for setting the predetermined value Ki is a product which is the gain value g1 multiplied by the gain value g2, both g1 and g2 decrease while the vehicle speed increases and while the steering angle increases respectively, the damping force characteristic is set HARD during high speed driving and high speed cornering where the high vehicle stability is required. Therefore the securing the stableness can be planned.

Furthermore, if the sprung member bounces in the insensible range where either $\dot{r}i$, the relative speed between the sprung member and the unsprung member, or $\dot{z}si$, the absolute speed of the sprung member, is less than the predetermined value $\delta ri$ and $\delta zi$ respectively, switching of the damping force characteristic of each corresponding shock absorber 1~4 is restricted. Thus, noise and oscillation caused by unnecessary and frequent switching of the damping force characteristic can be prevented. In this case, the damping force characteristic of each shock absorber 1~4 is maintained SOFT during the oscillation frequency is higher than the resonance point $\omega 2$ of the unsprung member or maintained HARD during the oscillation frequency region is lower than the resonance point $\omega 1$ of the sprung member. Thus, the improvement of riding comfort and running stability can be planned.

Furthermore, this control does not require a sensor for distinguishing low oscillation frequency region and high oscillation frequency region. This results in lesser cost since the detecting means for detecting the road surface and vehicle oscillation range is also not required. Although, the present invention has been shown and described in terms of the preferred embodiment thereof, it should not be considered as being particularly limited thereby. The details of any particular embodiment could be varied. For example, in the above embodiment, high oscillation frequency region and low oscillation frequency region are distinguished in the insensible range setting means 55 on the basis of $\dot{r}i(=\dot{z}s-\dot{z}u)$, the relative speed between the sprung member and the unsprung member, and $\dot{z}si$, the absolute speed of the sprung member. However, ri (=zs−zu), the relative displacement between the sprung member and the unsprung member can be used in stead of $\dot{r}i$, the relative speed between the sprung member and the unsprung member to distinguish high oscillation frequency region and low oscillation frequency region. That is, both the absolute value of ri(=zs−zu), the relative displacement between the sprung member and the unsprung member, and the absolute value of $\dot{r}i(=\dot{z}s-\dot{z}u)$, the relative speed between the sprung member and the unsprung member, are maximum at resonance points $\omega 1$ of the sprung member and $\omega 2$ of the unsprung member and also decrease during the oscillation frequency is lower than the resonance point $\omega 1$ of the sprung member and higher than the resonance point $\omega 2$ of the unsprung member. Therefore, an insensible range for restricting switching the damping force characteristic is formed if the absolute value of ri, the relative displacement between the sprung member and the unsprung member, is less than the predetermined value. Thus, the damping force characteristic of the shock absorber is maintained lower if both the absolute speed of the sprung member and the relative displacement between the sprung member and the unsprung member are within the insensible range and the damping force characteristic of the shock absorber is maintained higher if the absolute speed of the sprung member is out of the insensible range and the relative displacement between the sprung member and the unsprung member is within the insensible range.

Although the present invention is applied to a shock absorber of which the damping force characteristic is changed into higher level and lower level, it is a matter of course that the present invention is applicable to such a shock absorber that the damping force characteristic is variable into multisteps (more than three steps) or variable with steps.

What is claimed is:
1. A suspension system of a vehicle comprising:
a shock absorber having variable damping force characteristic provided between a sprung member and an unsprung member of said vehicle;

spring member absolute speed detecting means for detecting absolute speed of said sprung member;

relative speed detecting means for detecting relative speed between said sprung member and said unsprung member;

control means for controlling said damping force characteristic of said shock absorber by receiving signals from said detecting means and calculating a product which is the absolute speed of said sprung member multiplied by the relative speed between said sprung member and said unsprung member, wherein, when the product is more than a predetermined value (Ki), said damping force characteristic of said shock absorber is set high and when the product is less than said predetermined value (Ki), said damping force characteristic of said shock absorber is set low; and insensible range setting means for setting, with respect to control of said control means, an insensible range of the absolute speed of said sprung member and an insensible range of said relative speed between said sprung member and said unsprung member which restrict changing of said damping force characteristic when an absolute value of the absolute speed of said sprung member and an absolute value of the relative speed between said sprung member and said unsprung member are less than predetermined values ($\delta Zi$) and ($\delta ri$), respectively, wherein said damping force characteristic of said shock absorber is maintained soft when the absolute speed of said sprung member and the relative speed between said sprung member and said unsprung member are within said respective insensible ranges so that an oscillation frequency of said sprung member is in a high oscillation frequency region, and said damping force characteristic of said shock absorber is maintained hard when the absolute speed of said sprung member is out of said respective insensible ranges and the relative speed between said sprung member and said unsprung member is within said insensible range so that an oscillation frequency of said sprung member is in a low oscillation frequency region.

2. A suspension system as claimed in claim 1, wherein said predetermined value ($\delta Zi$) for setting said insensible range of the absolute speed of said sprung member is set higher than the absolute value of said absolute speed of said sprung member when the oscillation frequency of said sprung member is higher than a resonance point of said unsprung member, and the predetermined value ($\delta ri$) for setting said insensible range of the relative speed between said sprung member and said unsprung member is set higher than the absolute value of the relative speed between said sprung member and said unsprung member when said oscillation frequency is lower than a resonance point of said sprung member and when said oscillation frequency is higher than the resonance point of said unsprung member.

3. A suspension as claimed in claim 1 further comprising:

predetermined value changing means for changing the predetermined value Ki according to a road surface in said control means.

4. A suspension as claimed in claim 3, wherein said predetermined value changing means sets said predetermined value Ki by multiplying a gain value times a square of the relative speed between said sprung member and said unsprung member detected by said relative speed detecting means.

5. A suspension system as claimed in claim 4, wherein said gain value of the function for said predetermined value Ki decreases while vehicle speed increases.

6. A suspension system as claimed in claim 4, wherein said gain value of the function for said predetermined value Ki decreases while steering angle increases.

7. A suspension system as claimed in claim 1, wherein said sprung-member absolute speed detecting means comprises an accelerator sensor provided in the vicinity of said shock absorber and integrates vertical acceleration detected by said accelerator sensor and converts the absolute speed of said sprung member obtained by the integration to absolute speed of the sprung member at said shock absorber.

8. A suspension system as claim in claim 1, wherein aid shock absorber comprises a cylinder, a piston unit inserted slidably therein and two orifices provided in said piston unit, one of said orifices being opened/closed by an actuator wherein said damping force characteristic of said shock absorber is changed into two levels, high or low, by the operation of said orifices.

9. A suspension system as claimed in claim 8, wherein said actuator is electromagnetic.

10. A suspension system as claimed in claim 1, wherein said shock absorber is provided for each of four vehicle wheels, said shock absorber comprising a mode selecting switch for selecting a HARD, SOFT or CONTROL mode, wherein said damping force characteristic of all of said shock absorbers is set high when HIGH mode is selected and is set low when said SOFT mode is selected, and said damping force characteristic of each of said shock absorbers is sen variable automatically and independently of each other when said CONTROL mode is selected.

11. A suspension system of a vehicle comprising:

a shock absorber having variable damping force characteristic provided between a sprung member and an unsprung member of said vehicle;

a sprung member absolute speed detecting means for detecting absolute speed of said sprung member;

relative speed detecting means for detecting relative speed between said sprung member and said unsprung member;

relative displacement detecting means for detecting a relative displacement between said sprung member and said unsprung member;

control means for controlling said damping force characteristic of said shock absorber by receiving signals from detecting means and calculating a product which is the absolute speed of said sprung member multiplied by the relative speed between said sprung member and said unsprung member wherein, when the product is more than a predetermined value (Ki), said damping force characteristic of said shock absorber is set high and when the product is less than said predetermined value (Ki), the damping force characteristic of said shock absorber is set low; and an insensible range of the absolute speed of said sprung member and an insensible range of said relative displacement between said sprung member and said unsprung member setting means for setting, with respect to control of said control means, insensible range which restrict changing of said damping force characteristic when an absolute value of the absolute speed of said sprung member and an absolute value of the relative displacement between said sprung member and said unsprung member are less than predetermined values ($\delta Zi$) and ($\delta ri$), respectively, wherein said damping force characteristic of said shock absorber is maintained soft when the absolute speed of said sprung member and the relative displacement between said sprung member and said unsprung member are within said respective insensible ranges so that an oscillation frequency of said sprung member is in a high oscillation frequency region, and said damping force characteristic of said shock absorber is maintained hard when the absolute speed of said sprung member is out of said respective insensible ranges and the relative displacement between said sprung member and said unsprung member is within said insensible range so that an oscillation frequency of said sprung member is in a low oscillation frequency region.

12. A suspension system as claimed in claim 11, wherein said predetermined value ($\delta Zi$) for setting said insensible range of the absolute speed of said sprung member is set higher than the absolute value of said absolute speed of said sprung member when oscillation frequency of said sprung member is higher than a resonance point of said unsprung member and the predetermined value ($\delta ri$) for setting said insensible range of the relative displacement between said sprung member and said unsprung member is set higher than the absolute value of the relative displacement between said sprung member and said unsprung member when said oscillation frequency is lower than a resonance point of said sprung member and when said oscillation frequency is higher than the resonance point of said unsprung member.

13. A suspension system as claimed in claim 12, further comprising:
predetermined value changing means for changing the predetermined value Ki according to a road surface in said control means.

14. A suspension system as claimed in claim 13, wherein said predetermined value changing means sets the predetermined Ki value by multiplying a gain value times a square of the relative displacement between the sprung member and the unsprung member detected by said relative displacement detecting means.

15. A suspension system as claimed in claim 14, wherein said gain value of the function for said predetermined value Ki decreases while vehicle speed increases.

16. A suspension system as claimed in claim 14, wherein said gain value of the function for said predetermined value Ki decreases while steering angle decreases.

17. A suspension system as claimed in claim 13, wherein said sprung member absolute speed detecting means comprises an accelerator sensor provided in the vicinity of said shock absorber and integrates vertical acceleration detected by said accelerator sensor and converts the absolute speed of said sprung member obtained by the integration to absolute speed of said sprung member at said shock absorber.

18. A suspension system as claimed in claim 13, wherein said shock absorber comprises a cylinder, a piston unit inserted slidably therein, and two orifices provided in said piston unit, wherein one of said orifices is open at all times and the other orifice is opened/closed by an actuator, wherein the damping force characteristic of said shock absorber is changed into two levels, high or low, by the operation of said orifices.

19. A suspension system as claimed in claim 18, wherein said actuator is electromagnetic.

20. A suspension system as claimed in claim 13, wherein said shock absorber is provided for each of four vehicle wheels, said shock absorber comprising a mode selecting switch for selecting a HARD, SOFT, or CONTROL mode, wherein said damping force characteristic of all of said shock absorbers is set high when said HIGH mode is selected and is set low when said SOFT mode is selected, and said damping force characteristic of each of said shock absorbers is set variable automatically and independently of each other when said CONTROL mode is selected.

* * * * *

UNITED STATES PATENT AND TRADEMARK OFFICE
CERTIFICATE OF CORRECTION

PATENT NO. : 5,400,245

DATED : Mar. 21, 1995

INVENTOR(S) : Butsuen et al.

It is certified that error appears in the above-identified patent and that said Letters Patent is hereby corrected as shown below:

Claim 10, col. 12, line 34, "sen" should read --set--.

Claim 14, col. 14, line 1, "Ki value" should read --value Ki--.

Signed and Sealed this

First Day of August, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,400,245
DATED : March 21, 1995
INVENTOR(S) : Butsuen, et al.

It is certified that error appears in the above-identified patent and that said Letters Patent is hereby corrected as shown below:

Claim 11, col. 12, lines 61-66, "an insensible range of the absolute speed of said sprung member and an insensible range of said relative displacement between said sprung member and said unsprung member setting means for setting, with respect to control of said control means, insensible range..."

should read:

--insensible range setting means for setting, with respect to control of said control means, an insensible range of the absolute speed of said sprung member and an insensible range of said relative displacement between said sprung member and said unsprung member...--

Signed and Sealed this

Tenth Day of October, 1995

Attest:

BRUCE LEHMAN

*Attesting Officer*    *Commissioner of Patents and Trademarks*